(12) United States Patent
Fagiano et al.

(10) Patent No.: US 10,201,154 B2
(45) Date of Patent: Feb. 12, 2019

(54) SYSTEM AND METHOD FOR STORING LIVE SEAFOOD

(71) Applicant: EMYG-ENVIRONNEMENT ET AQUACULTURE, Carnoux-en-Provence (FR)

(72) Inventors: Giancarlo Fagiano, Carnoux-en-Provence (FR); Armand Lejeune, Saint-Jean-de-Liversay (FR)

(73) Assignee: EMYG-ENVIRONMENT ET AQUACULTURE, Carnoux-en-Provence (FR)

( * ) Notice: Subject to any disclaimer, the term of this patent is extended or adjusted under 35 U.S.C. 154(b) by 174 days.

(21) Appl. No.: 15/502,099

(22) PCT Filed: Aug. 5, 2014

(86) PCT No.: PCT/FR2014/052041
§ 371 (c)(1),
(2) Date: Feb. 6, 2017

(87) PCT Pub. No.: WO2016/020579
PCT Pub. Date: Feb. 11, 2016

(65) Prior Publication Data
US 2017/0223936 A1     Aug. 10, 2017

(51) Int. Cl.
*A01K 63/02* (2006.01)
*A01K 63/04* (2006.01)
*A01K 63/06* (2006.01)

(52) U.S. Cl.
CPC ............ *A01K 63/047* (2013.01); *A01K 63/02* (2013.01); *A01K 63/065* (2013.01); *A01K 63/04* (2013.01); *A01K 63/045* (2013.01); *A01K 63/06* (2013.01)

(58) Field of Classification Search
CPC ...... A01K 63/02; A01K 63/04; A01K 63/047; A01K 63/00
See application file for complete search history.

(56) References Cited

U.S. PATENT DOCUMENTS 485,422 A * 11/1892 McGray .............. A01K 63/02
119/202
4,089,298 A * 5/1978 Wilson .............. A01K 63/02
119/201

(Continued)

FOREIGN PATENT DOCUMENTS

CA     2944984 A1 * 10/2015 ............ A01K 63/02
CA     2957119 A1 *  2/2016 ............ A01K 63/02

(Continued)

OTHER PUBLICATIONS

Apr. 14, 2015 International Search Report issued in International Patent Application No. PCT/FR2014/052041.

(Continued)

*Primary Examiner* — Kristen C Hayes
(74) *Attorney, Agent, or Firm* — Oliff PLC (57) ABSTRACT

A system for storing live seafood, includes: compartments into which the seafood is introduced, a hydraulic circuit to cause water to circulate, an installation for treating the water, characterized in that: the compartments form part of at least one module taking the form of a unit which unit is made of a lightweight material, the water flow generated by the hydraulic circuit enters the compartments via the upstream end and reemerges via the downstream end thereof, the water circulating through the compartments is kept at a temperature of below 25° C.

15 Claims, 4 Drawing Sheets

(56) References Cited

U.S. PATENT DOCUMENTS

| | | | | | |
|---|---|---|---|---|---|
| 5,156,111 | A | * | 10/1992 | Heggelund | A01K 63/02 119/218 |
| 5,377,622 | A | * | 1/1995 | Lauttenbach | A01K 63/00 119/200 |
| 6,712,022 | B2 | * | 3/2004 | Fullerton, III | A01K 63/02 119/201 |
| 9,226,475 | B2 | * | 1/2016 | Castranova | A01K 1/03 |

FOREIGN PATENT DOCUMENTS

| | | |
|---|---|---|
| JP | S64-13931 | 1/1989 |
| JP | H04-173037 | 6/1992 |

OTHER PUBLICATIONS

Apr. 14, 2015 Written Opinion issued in International Patent Application No. PCT/FR2014/52041.

* cited by examiner

SYSTEM AND METHOD FOR STORING LIVE SEAFOOD

TECHNICAL FIELD OF THE INVENTION

The subject of the invention is a system and a method for storing live seafood.

It relates to the technical field of the storage and transportation of live lobsters, spiny lobsters, shrimps, crayfish, crabs, fish, oysters and crustaceans, shellfish, corals, seaweed and, in general, all seafood inhabiting salt water or fresh water.

PRIOR ART

The storage and transportation of live seafood, be this by sea, by air or over land, are particularly delicate operations. Indeed, the journey may last a number of hours or even a number of days between their location of fishing or harvesting (e.g. on the American continent) and their final, selling destination (e.g on the European continent). To date, in the majority of cases, the produce is frozen during its transportation. It is thus no longer alive at its final destination. This state of being frozen has a negative effect on the quality and the flavor of this produce.

Document U.S. Pat. No. 4,089,298 (TRANS HOWARD LANG) discloses an installation for transporting live seafood. The latter is placed live in separate tubular compartments. A hydraulic circuit generates a circulation of water in each of these compartments. This water in circulation is processed to adapt the composition thereof to the stored produce.

This technical solution is advantageous in that it makes it possible to limit the weight of water to be transported and thus to reduce transportation costs. The seafood is neither entangled, nor tightly packed, nor crushed by the upper layers, nor disturbed by the immediate presence of other seafood, and is stocked in optimum living conditions without stress or, at the very least, in limited-stress conditions. This is essential in order to preserve the flavor qualities of the flesh of the seafood.

This TRANS HOWARD LANG installation, however, has a number of drawbacks. First, the compartments are an integral part of a structure that comprises the hydraulic circuit and the salt water processing device. The seafood thus has to be previously placed in specific trough-shaped holders prior to being placed in the compartments. This multiplies the tasks that have to be performed by an operator in order to place the produce in storage/remove the produce from storage.

It is likewise necessary to close off each compartment in a sealed manner. In practice, the service life of this sealing is limited, essentially owing to the corrosive effect of salt water on the seals.

Furthermore, on account of the complex hydraulic circuit that is used (notably, the use of supply hoses and overflow hoses or orifices), the water must in all probability stagnate in the bottom of the troughs. This stagnant water cannot thus be suitably recycled. Moreover, the diameter of the overflow hoses and orifices limits the throughput of the water flow passing through the compartments. All this contributes to a deterioration, over time, in the preservation of the seafood.

Lastly, the storage capacity of this TRANS HOWARD LANG installation is relatively small.

The invention aims to remedy this situation while at the same time retaining the aforesaid advantages.

In particular, an object of the invention is to propose a system for storing live seafood, the design of which makes it possible to reduce the number of tasks involved in placing said seafood in storage/removing said seafood from storage.

A further object of the invention is to propose a system for storing live seafood, the design of which is simple, inexpensive and easily transportable.

Yet a further object of the invention is to propose a storage system that makes it possible to preserve the live seafood under optimum conditions.

A supplementary object of the invention is to propose a system for storing seafood of which the storage capacity is greater than that of the TRANS HOWARD LANG installation.

Another object of the invention is to propose a technique for storing seafood that makes it possible to maintain a constant level of freshness and of liveliness among the individual items.

DISCLOSURE OF THE INVENTION

The solution proposed by the invention is a system for storing live seafood comprising:
separate tubular compartments, each having an upstream end and a downstream end, the seafood being placed live into said compartments,
a hydraulic circuit adapted to generate a circulation of water in each of the compartments,
an installation adapted to treat the water in circulation so as to adapt the composition thereof to the seafood.

This system is noteworthy in that:
the tubular compartments form part of at least one module in the form of a unit in which said compartments are provided, which unit is made from a lightweight material so that it can be handled, when empty, by one operator, said module being detachable from the hydraulic circuit and from the processing installation,
the tubular compartments have an upstream end and a downstream end that are open, the water flow generated by the hydraulic circuit penetrating said compartments by the upstream end thereof and re-emerging by the downstream end thereof, the seafood being immersed in this water flow, the installation is adapted to maintain the water circulating in the compartments at a temperature below 25° C.

The seafood may now be placed directly in the compartments, in the live state, without it being necessary to place them previously into specific holders. The operator can thus place the seafood into storage/remove the seafood from storage in the module rapidly, doing so even more readily since the module is easy to handle.

As the compartments have openings, the zones where water might stagnate are considerably reduced or even excluded, which helps to improve the conditions of preservation of the seafood. The water flow likely to pass through the compartments may be at a throughput that is greatly superior to that of the water flow generated in the TRANS HOWARD LANG installation.

These modules may also be readily juxtaposed and stacked in order to increase the density of the seafood to be stored.

Furthermore, any impacts or vibrations are fully or partly dampened by the material of the module, which has a good absorption capacity, and by the water contained in the compartments.

Further advantageous features of the invention are listed below. Each of these features may be considered in isolation or in combination with the noteworthy features defined above and, if appropriate, be the subject of divisional patent applications:

A plurality of modules are preferably inserted into a watertight receptacle, which receptacle is connected to the hydraulic circuit so as to form a bath in which all said modules are immersed, said hydraulic circuit being adapted to generate a circulation of water in said receptacle and to create a water flow in each of the compartments, between the upstream end thereof and the downstream end thereof.

The modules may be juxtaposed and stacked inside the receptacle so as to form adjacent walls of modules arranged one behind another.

Certain modules may have compartments with dimensions different than those of other modules, The receptacle, the hydraulic circuit, and the water processing installation are preferably installed in a parallelepipedal 20-foot, 40-foot or 45-foot container adapted for transportation by ship or aircraft.

A plurality of receptacles may be juxtaposed inside the container, each of said receptacles being connected to the hydraulic circuit.

The receptacle and/or the container are advantageously isothermal.

The installation is preferably adapted to maintain the water circulating in the compartments at a temperature between 1° C. and 5° C.

The water processing installation advantageously comprises a buffer vessel connected to the hydraulic circuit, a cooling device being immersed in said vessel.

This cooling device may have the form of an exchanger in which cold air generated by an air-conditioning module circulates.

Each module preferably has the form of a unit in which tubular compartments are provided, disposed in rows and/or columns and/or in a staggered fashion.

The downstream end of each compartment is preferably partially closed off by a divisible closing means adapted to prevent the seafood from exiting said compartment, while at the same time allowing the water flow to pass through.

A further aspect of the invention relates to a method for storing live seafood comprising:
placing the live seafood in separate tubular compartments each having an upstream end and a downstream end,
generating a circulation of water in each of the compartments,
processing the water in circulation so as to adapt the composition thereof to the seafood.

This method is noteworthy in that it further comprises the steps consisting in:
providing the tubular compartments in at least one module having the form of a unit, said compartments being made such that the upstream end thereof and the downstream end thereof are open, which unit is produced from a lightweight material so that it can be handled, when empty, by one operator,
generating a water flow to penetrate the compartments via the upstream end thereof and to re-emerge via the downstream end thereof, the seafood being immersed in this water flow,
maintaining the water circulating in the compartments at a temperature below 25° C.

Preferably, the water is taken directly from the location where the live seafood is fished or harvested.

In addition, after having placed the live seafood in each of the compartments, it is possible to:
insert the module into a watertight receptacle,
introduce water into the receptacle so as to form a bath in which the module is immersed, and continuously circulate the water in said receptacle so as to create a water flow in each of the compartments, between the upstream end thereof and the downstream end thereof.

DESCRIPTION OF THE FIGURES

Further advantages and features of the invention will become more clearly apparent on reading the following description of a preferred embodiment, with reference to the appended drawings, which are given by way of indicative, non-limiting examples, and in which.

PREFERRED EMBODIMENT OF THE INVENTION

The following description takes the example of lobsters as seafood, but this does not limit the scope of the present invention, which applies equally to spiny lobsters, shrimps, crayfish, crabs, fish, oysters and crustaceans, shellfish, corals, seaweed, etc. Generally, "sea" food is understood to mean produce living in salt water or in seawater.

Figure 1:
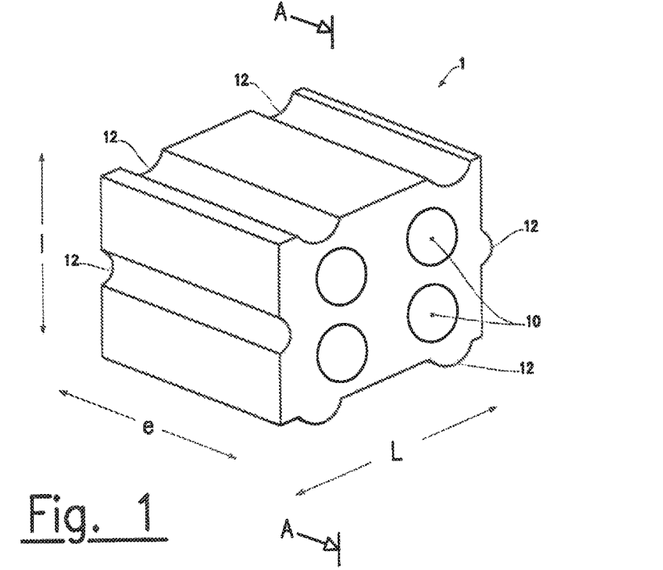
FIG. 1 is an isometric perspective view of a storage module according to the invention.

In FIG. 1, the module 1 according to the invention has the form of a substantially parallelepipedal unit. Its length "L" is, for example, between 20 cm and 2 m, its width "l", for example, between 10 cm and 2 m, and its thickness "e", for example, between 10 cm and 1 m.

This unit is made from a lightweight material so that it can be handled, when empty, by a single operator. It is preferably made from expanded polymer of the polystyrene type, which is inert and well able to withstand the corrosive effect of salt water. Use may also be made of a hollow unit obtained by molding polyethylene-type plastics. The use of a lightweight material further makes it possible to lighten the overall weight of the system and thus to reduce transportation costs.

Compartments 10 are provided in the unit forming the module 1. These compartments 10 are tubular and the cross section thereof is preferably circular, such that they are cylindrical. Their diameter is, for example, between 5 cm and 15 cm, They are rectilinear, horizontal, and extend into the entire thickness "e" of the module 1. Their length thus corresponds to this thickness "e".

In the appended figures, the module 1 comprises four compartments 10 arranged in two horizontal rows and two vertical columns. Quite obviously, a greater or smaller number of compartments 10 may be envisaged, and such compartments may be arranged in rows and/or in columns and/or in a staggered fashion.

As at least one item of seafood P is intended to be placed in the compartment 10, the minimum length of said compartment (and thus the thickness "e") has to correspond to the overall length of the longest item of seafood to be transported (e.g. that of a lobster), it being specified that this overall length corresponds to the distance between the extreme, front and rear, points of said item P. The diameter of the compartment 10 also has to be adapted to the dimensions of the item P in order that the latter is not compressed.

The compartments 10 each have an upstream end 10a and a downstream end 10b. These two ends 10a. 10b are open such that the compartments 10 open out on the front and rear faces of the module 1.

Figure 2:
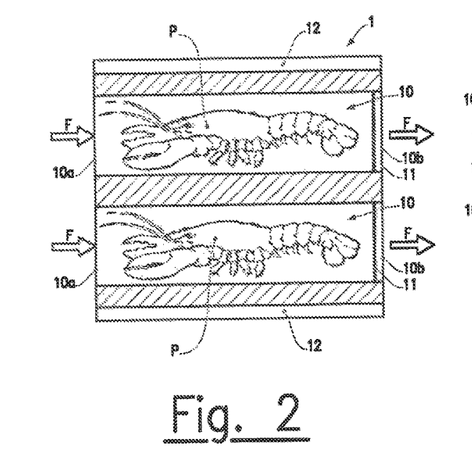
FIG. 2 is a sectional view on A-A of the module of FIG. 1, lobsters being placed in the compartments.

As illustrated in FIG. 2, the lobsters P are placed live into the compartments 10. It is envisaged that only one lobster P will be placed in each compartment 10. This configuration makes it possible to isolate the lobsters from others of their species and to not cause them disturbance. The conditions of stress are thus reduced.

The lobsters P are placed in the compartments 10 via the upstream end 10a pushed toward the downward stream end 10b. As the lobsters P are moved rearward, they are unable to re-emerge via the upstream end 10a. To prevent them escaping via the downstream end 10b, this is partly closed off by a divisible closure means 11. Said closure means is adapted to prevent the lobsters P from exiting the compartment 10 while at the same time allowing the water flow F to pass through without obstruction.

Figure 3:
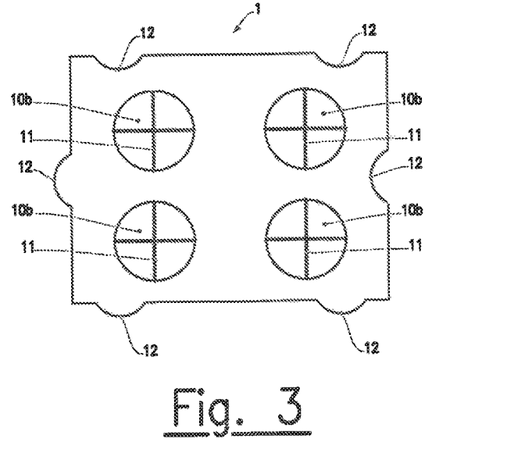
FIG. 3 is a rear view of a module of FIG. 1, showing means for partly closing off the compartments.

In FIG. 3, the closure means 11 has the form of two bars arranged as an X. These bars may be obtained at the time that the unit forming the module 1 is molded, or may be attached. They are, for example, made from a semi-rigid or rigid plastics material, and their diameter is such that they can readily be broken manually or by a sudden movement on the part of the lobster P initiated by the operator.

Figure 4:
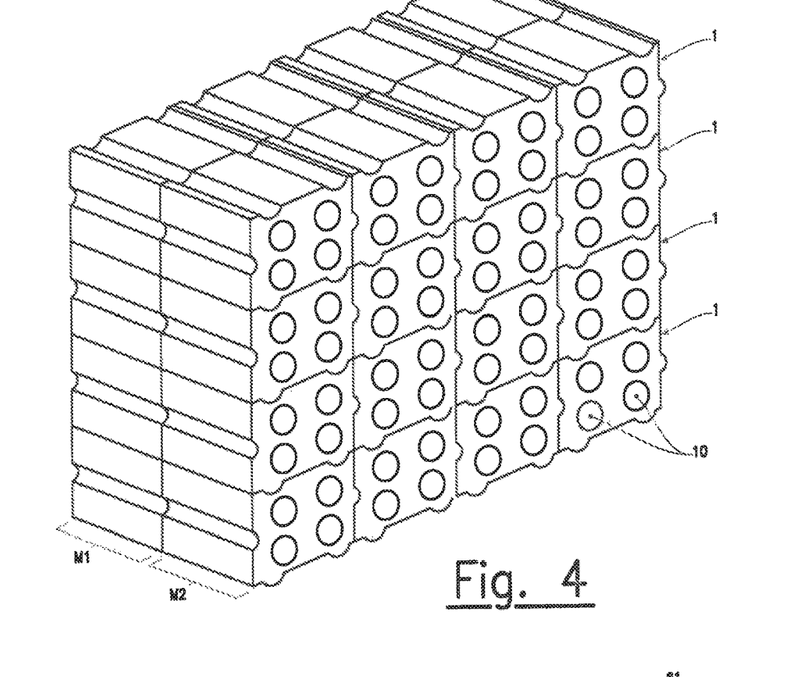
FIG. 4 illustrates an example of stacking modules according to the invention.

Each module 1 is advantageously provided with means 12 for positioning and nesting with adjacent modules. In FIGS. 1 and 3, these means 12 are complementary grooves and ribs arranged on the lateral faces of the module 1. These means 12 facilitate the positioning and holding-together of the modules 1 when they are juxtaposed and stacked, forming a series of adjacent walls M1, M2 arranged one behind the other (FIG. 4). Each wall M1, M2 may be several meters high and long. The walls are formed from a plurality of modules 1 arranged either as vertical columns or as horizontal rows.

In practice, a first wall M1 of modules 1 is erected that is filled with lobsters. The lobsters are placed manually into the compartments 10 one by one before, during or after the erection of the wall M1. Once the first wall M1 is filled with lobsters, a second wall M2 of modules 1 is erected in the same way in front of the first wall M1. The procedure is the same for the other successive walls.

Figure 5:
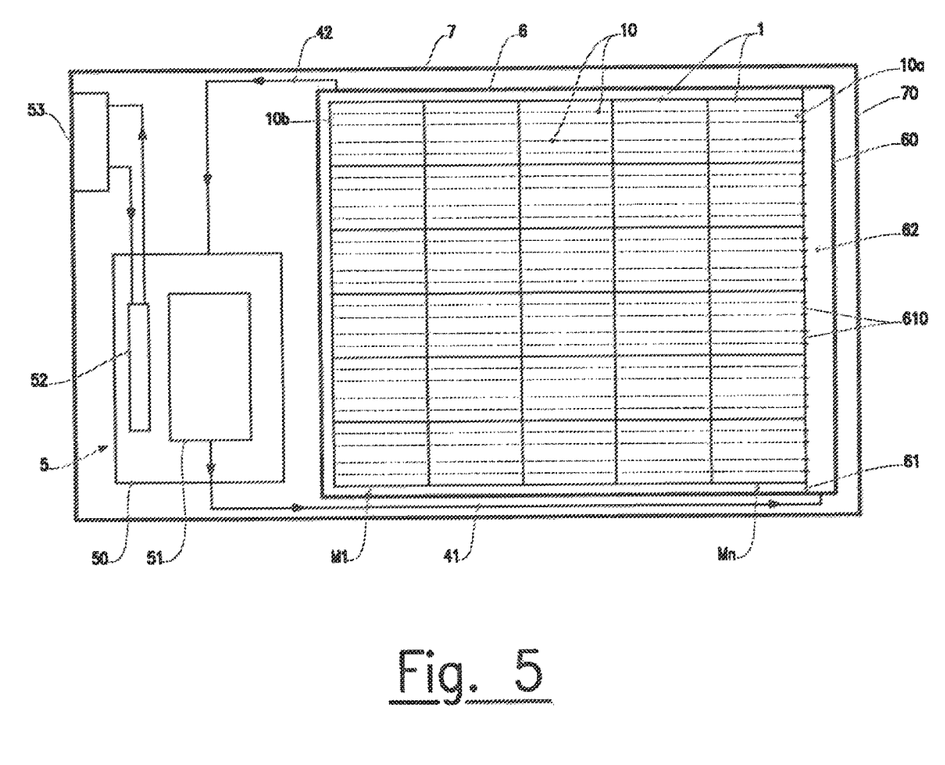
FIG. 5 is a schematic longitudinal sectional view of a system according to the invention, in which the modules are placed in a receptacle that is itself installed in a transportation container.

As the modules 1 are identical, the compartments 10 of juxtaposed modules 1 belonging to juxtaposed walls are in the same alignment (FIG. 5). Thus, the closure means 11 of the modules 1 a wall (e.g. M2) are opposite the upstream openings 10a of the compartments 10 of the modules 1 of the juxtaposed wall preceding it (e.g. M1). In use, each compartment 10 is thus closed off at the level of its downstream end 10b by its own closure means 11 and at the level of its upstream end 10a by the closure means 11 of the compartment succeeding it.

Each module 1 may be identified by an identification means of the bar code or RFID chip type. This identification means makes it possible, for example, to ascertain the nature of the produce P, the date and place where it was fished, its destination, etc. Such means thus promote smooth organization in terms of the storage of the modules 1 and/or during their unloading.

A circulation of water is generated in each of the compartments 10. This circulation, or flow, is shown schematically by the arrow referenced F in FIG. 2. The water penetrates into the compartment 10 via the upstream end 10a and re-emerges via the downstream end 10b. Thus, the produce P is completely immersed in this flow F. In the case of a lobster, the latter is thus in a stream of water oriented from its head toward its tail. A stream of this type helps to reduce the animal's state of stress. The throughput of water circulating in the compartments 10 may vary between 1 L/min and 100 L/min. The effect of this stream, combined with the open configuration of the ends 10a and 10b prevents any sedimentation, thereby achieving better filtration, and, as explained previously in the description, ensures homogeneous distribution of oxygen and temperature throughout the mass of water circulating in the compartment 10.

The water used is generally salt water, but may likewise be fresh water, depending on the species of produce to be transported, for example in the case of crayfish. Always with a view to providing optimum transportation conditions for the seafood, it is advantageous to use water taken directly from the location of fishing or harvesting of said produce. In FIG. 5, this water is stored in a buffer vessel 50, the dimensions of which are adapted to the final storage capacity for the produce P.

The water contained in the vessel 50 is conveyed to the modules 1 by means of a hydraulic circuit. Said circuit is adapted to generate the water flow F in each of the compartments 10. The water then returns to the vessel 50. The water thus circulates in a closed circuit, for optimum water quality.

In FIG. 5, the hydraulic circuit is composed of one or more input channels 41 conveying the water from the vessel 50 toward the modules 1 and of one or more return channels 42 conveying the water from the modules 1 toward the vessel 3. The hydraulic circuit also comprises one or more pumps and also regulation members of the manual, electro-pneumatic and/or electric valve type.

An installation 5 makes it possible to process the water in circulation so as to adapt its composition to the seafood P housed in the modules 1. This installation 5 is adapted to monitor the physico-chemical characteristics of the water penetrating the modules 1 via the input channel 41 and in particular its salinity, its pH, its oxygen level and other, mineral and/or nutrient, compounds. It also makes it possible to eliminate pollutants, particles and organisms detrimental to the preservation of the produce P, such as bacteria, suspended matter, bacterial substrates, etc.

In addition to the vessel 50, the installation 5 comprises an apparatus 51 that simultaneously performs at least the functions of filtration, oxygenation and homogenization of the water circulating in said apparatus. Use is preferably made of an apparatus of the type marketed by EMYG under the SKIM® brand. This apparatus is immersed in the vessel 50. It is, in particular, described in patent documents FR2957566 (EMYG) and US2003/164340 (LEJEUNE), to which a person skilled in the art may refer if necessary. Use may also be made of a filtration and oxygenation apparatus placed outside the vessel 50 and of the type marketed by EMYG® under the PROTOS® brand. This type of apparatus is located outside the vessel 50. It is, in particular, described in patent document FR2957566 mentioned above, to which a person skilled in the art may refer if necessary.

Supersaturation of the water with oxygen, between 60% and 120% of the oxygen saturation of atmospheric air, makes it possible to ensure the long preservation of the seafood P.

For optimum preservation of the quality of the seafood P, the water circulating in the compartments 10 is maintained at a temperature below 25° C., advantageously between 1° C. and 5° C., preferably between 1° C. and 3° C. These cold temperatures plunge the seafood P into not only a state of quasi-immobility but also a state of relaxation, which prevents them from experiencing stress when subjected to the stimuli generated by transportation (vibration, noise, impact, etc.).

Water temperature regulation is achieved by the installation 5. To that end, said installation comprises a cooling device 52 immersed in the vessel 50. This cooling device 52 is in the form of an exchanger through which the cold air generated by an air-conditioning module 53 circulates. This air-conditioning module is of the type customarily used to condition the interior of a transportation container 7. As its design is known, it will not be described in greater detail in the present description. However, a person skilled in the art may, if required, refer to the aforesaid patent document FR 2957566.

The salinity and the pH of the water are also regulated in accordance with the technique described in the aforesaid patent document FR2957566.

Minerals and/or nutrient elements may be provided in the vessel 50 or elsewhere in the hydraulic circuit. Appropriate sensors make it possible to measure the concentration of minerals and/or nutrient elements in the water. This measurement is taken continuously or periodically. Depending on these measurements, and particularly depending on whether they are below reference values, a metering pump injects a dose of minerals and/or nutrient elements into the water. This dose may be liquid or solid, and be in the form of tablets or soluble powder, for example.

The modules 1 may be directly placed in a transportation container 7. The latter is known and standardized. It has a generally parallelepipedal shape, and has a length of 20 feet, 40 feet or 45 feet. It is accessible via a sealed door 70 and is adapted to be transported by ship or by aircraft. Some such containers being sealed, seawater-corrosion resistant and isothermal, their use is suitable for the invention. In this case, for reasons of sealing, it is preferable to move the process of the installation 5 outside the container. This may be problematic, particularly in terms of space and security.

As illustrated in FIG. 5, it is preferred to place the modules 1, the hydraulic circuit 41, 42 and the installation 5 directly in a parallelepipedal 20-foot, 40-foot or 45-foot container 7 adapted to be transported by a ship or aircraft. More particularly, the modules 1 are juxtaposed and stacked inside a receptacle 6 that is watertight. The modules 1 are thus rendered totally detachable from the hydraulic circuit 41, 42 and the installation 5.

In FIG. 5, the receptacle 6 has a parallelepipedal shape, the dimensions of which enable it to be placed in the container 7. It may be made from plastic, for example by molding, or from stainless steel, for example by welding or riveting of plates. It has a sealed door 60, arranged opposite the door 70 of the container 7, via which the modules 1 are put in place. Advantageously, the receptacle 6 and/or the container 7 are isothermal so as to reduce thermal loss from the cold water circulating in the modules 1 and/or to limit thermal shocks due to exterior climatic conditions.

The receptacle 6 is connected to the hydraulic circuit 41, 42 so as to form a bath in which all the modules 1 are immersed. All the compartments 10 are thus filled with water and the lobsters P immersed. The hydraulic circuit generates a circulation of water in the receptacle 6 and, as illustrated in FIG. 2, creates a water flow F in each of the compartments 10, between the upstream end 10a thereof and the downstream end 10b thereof. The period of time between the moment at which the lobsters P are stowed in the compartments 10 and the moment when the water is placed in circulation in the receptacle 10 is very short. The period of time for which the lobsters are exposed to the open air is minimal.

To be certain that the receptacle 6 is completely filled, the inlet channel 41 opens out at the level of the bottom of said receptacle, in front of the upstream ends of the modules 1 of the last wall Mn, and the return channel 42 opens out at the level of the ceiling, behind the downstream ends of the modules 1 of the first wall M1.

In the configuration of FIG. 5, the circulation of water in the receptacle 6, between the two channels 41, 42, ensures good restoration of the flow F in each of the modules 1. The volume of water in circulation in the receptacle 6 is minimal, and corresponds only to the cumulative volume of the compartments 10, less the cumulative volume of the lobsters P. A ratio (weight$_{(produce)}$/weight$_{(produce+water)}$) between 40% and 70%, and generally in excess of 50%, may be achieved.

Figure 7:
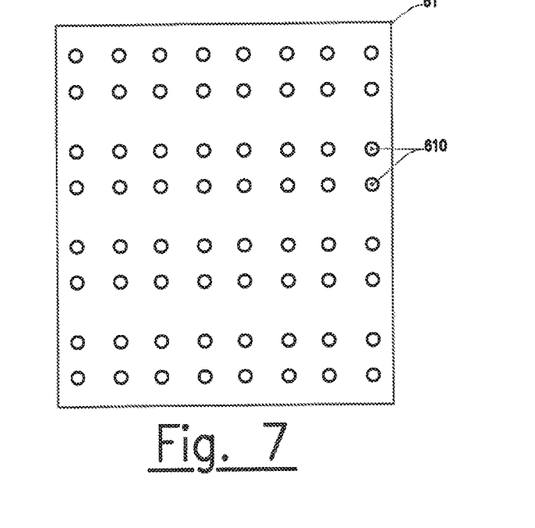
FIG. 7 is a schematic front view of a distribution device allowing the water flow to be distributed homogeneously into the various modules.

The restoration of the flow F in the compartments 10 is improved by installing a throughput distribution device 61 in front of the upstream ends of the modules 1 of the last wall Mn. In FIGS. 5 and 7, this distribution device 61 consists of a perforated plate positioned sealingly in the receptacle 6, bearing against the modules 1 of the wall Mn. This plate is made from the same material as that of the receptacle 6. The distribution device 61 is offset from the door 60 so as to delimit a chamber 62 into which the inlet channel 41 opens out. It is thus the chamber 62 that is filled with water first.

As shown in FIG. 7, the plate forming the distribution device 61 is perforated, the perforations 610 coinciding with the upstream ends 10a of the modules 1 of the last wall Mn. The water contained in the chamber 62 is thus distributed homogeneously in each of the compartments 10.

In order further to improve this distribution of the water flow, certain modules 1 may have compartments 10 that have dimensions different than those of other modules. In the example of FIG. 5, the compartments of the modules 1 located at the bottom of the receptacle 6 in practice receive a greater throughput of water than those of the modules located at the top of said receptacle. In order to balance out the throughputs, the compartments of the modules 1 located at the bottom of the receptacle 6 may have a smaller diameter than those of the modules 1 located at the top of said receptacle. An identical result is obtained by similarly dimensioning the perforations 610 of the distribution device 61.

Figure 6:
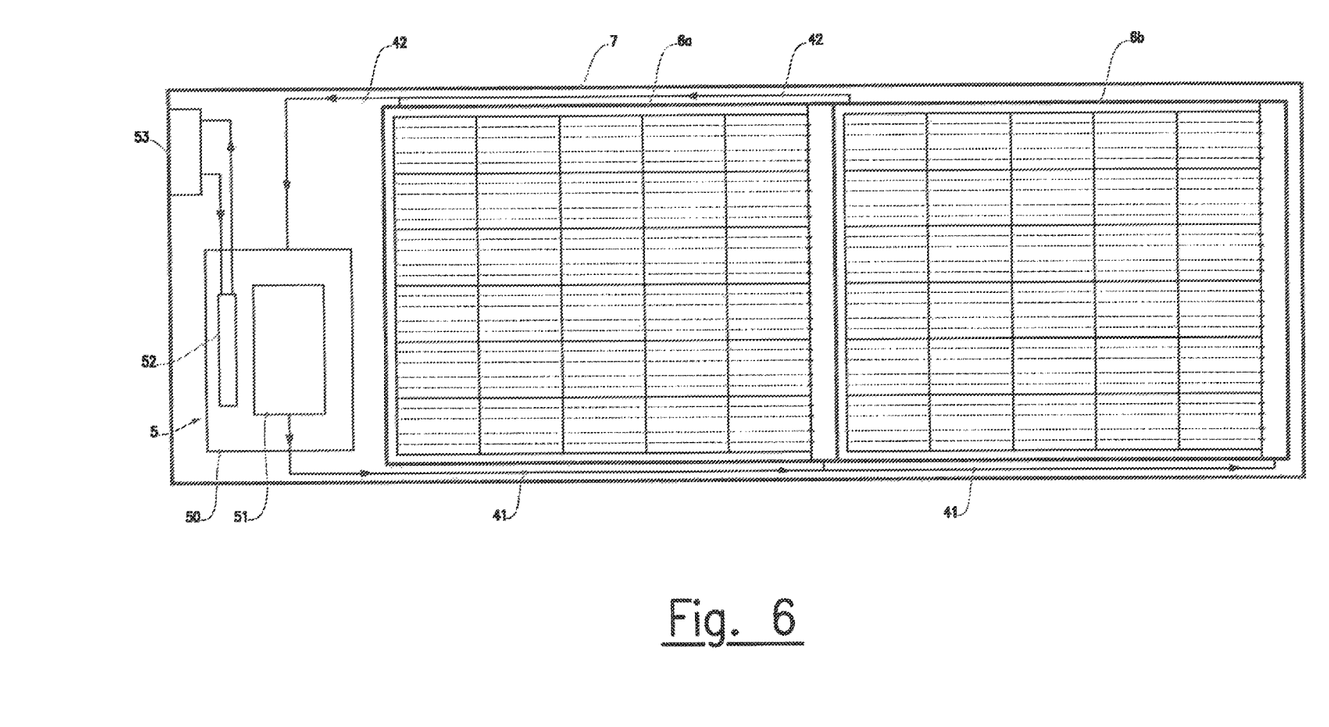
FIG. 6 illustrates a system similar to that of FIG. 5, a plurality of receptacles being installed in a single transportation container.

In FIG. 6, a plurality of receptacles 6a, 6b are juxtaposed inside the container 7 to multiple the storage capacity. This configuration is, in particular, adopted when the container 7 is sufficiently large, for example a 40-foot or 45-foot container. Each receptacle 6a, 6b is connected to the hydraulic circuit 41, 42, which is itself arranged with the installation 5.

The electrical energy required for the operation of the installation 6 and the pumps used for placing the water in circulation in the hydraulic circuit comes from one or more batteries and/or solar panels, and/or an electrical connection to an electrical network onboard the transportation ship or aircraft, enabling the container 7 to be supplied with power.

When the container 7 arrives at its destination, it suffices, after the receptacle 6 has been emptied, to dismantle the walls M1, Mn in order to recover the modules 1 with their lobsters P. By breaking the closure means 11, the latter may be easily removed. The lobsters P may then be sold directly to end-consumers or placed in a tank. In this case, also, the period of time during which the lobsters are in the open air is very short.

The system just described makes it possible to reduce the mortality rate to below 5%, particular to below 2%, during transportation of the produce P lasting several weeks. In the case of lobsters, their low state of stress during transportation is reflected in satisfactory liveliness and energetic movements when they exit from the compartments 10. The colors are bright, the tails are tightly curled and the claws are robust and ready for fighting.

When cooked by poaching, the shells are full and dense, their flesh firm and flavorsome. The iodized aromas exhibit no ammoniated taste or smell, this often being a feature of crustaceans under stress and in distress.

Cooked whole in an oven, stressed or distressed lobsters being cooked in this way are liquefied owing to the slower penetration of heat to the core of the produce. In the present case, no liquefaction was observed. After removal of their shells, the lobsters are full and fleshy, their flavor attesting to perfect freshness identical to that of lobsters freshly caught in the open sea.

Cooked grilled, butterflied on a griddle, their shell cut in the raw state along the length reveals firm coral of a bright color. Dense in their shell, no sign of liquefaction of the insides was observed. On the contrary, through the effect of salt, agitation of the flesh demonstrated a high degree of liveliness.

All the lobsters have the same state of freshness and liveliness. No significant disparity was observed.

The arrangement of the various elements and/or means and/or steps of the invention in the embodiments described above must not be understood as requiring an arrangement of this type in all implementations. In any event, it will be understood that a range of modifications may be made to these elements and/or means and/or steps without departing from the spirit and scope of the invention. In particular:
  The unit forming the module 1 does not necessarily have a paralellepidal shape. It may, for example, be of hexagonal or cylindrical shape.
  The compartments 10 are not necessarily cylindrical. They may be tubular, but with an oval, square, rectangular, polygonal, etc. cross section. They may also be conical. Likewise, they are not necessarily rectilinear or horizontal, but may have a certain curvature and/or be inclined, their shape and/or orientation being adapted to the species to be transported.
  A plurality of seafood P may be placed live in each compartment 10, in particular for the transportation of shrimps, oysters, seaweeds, shellfish or corals, where a concentration greater than one specimen per compartment 10 is acceptable, taking care, nevertheless, not to pack them tightly or to squash them.
  The bars forming the closure means 10 may be arranged in the form of grills or mesh.
  The modules 1 are not necessarily stowed in transportable containers, but may be accommodated in smaller transportation cabinets. They may, in any event, be stowed in fixed cabinets when the seafood P is not for transportation but simply to be stored.
  A plurality of buffer vessels 3 may be used. For example, provision may be made for a vessel of seawater and a vessel of freshwater, each of these vessels making it possible to supply modules containing different species (e.g. lobsters on the one hand and crayfish on the other).
  The receptacle 6 may be removable or fixed relative to the container 7. In the case of a fixed receptacle 6, the latter may be delimited by attaching leaktight walls to the interior of the container 7.
  When a plurality of receptacles 6a, 6b are placed in one and the same container 7, they may be connected to their own hydraulic circuit and to their own processing installation. In this way, one of these receptacles may receive produce living in salt water (e.g. lobsters or shrimps), it being possible for the others to receive produce living in freshwater (e.g. crayfish).

The invention claimed is:

1. A system for storing live seafood comprising:
separate tubular compartments, each having an upstream end and a downstream end, the seafood being placed live into said compartments,
a hydraulic circuit adapted to generate a circulation of water in each of the compartments,
an installation adapted to treat the water in circulation so as to adapt the composition thereof to the seafood,
wherein:
  the tubular compartments form part of at least one module in the form of a unit in which said compartments are provided, which unit is made from a lightweight material so that it can be handled, when empty, by one operator, said module being detachable from the hydraulic circuit and from the processing installation,
  the tubular compartments have an upstream end and a downstream end that are open, the water flow generated by the hydraulic circuit penetrating said compartments by the upstream end thereof and re-emerging by the downstream end thereof, the seafood being immersed in this water flow,
  the installation is adapted to maintain the water circulating in the compartments at a temperature below 25° C.

2. The system as claimed in claim 1, wherein a plurality of modules are inserted into a watertight receptacle, which receptacle is connected to the hydraulic circuit so as to form a bath in which all said modules are immersed, said hydraulic circuit being adapted to generate a circulation of water in said receptacle and to create a water flow in each of the compartments, between the upstream end thereof and the downstream end thereof.

3. The system as claimed in claim 2, wherein the modules are juxtaposed and stacked inside the receptacle so as to form adjacent walls of modules arranged one behind another.

4. The system as claimed in claim 2, wherein certain modules have compartments with dimensions different than those of other modules.

5. The system as claimed in claim 4, wherein a plurality of receptacles are juxtaposed inside the container, each of said receptacles being connected to the hydraulic circuit.

6. The system as claimed in claim 4, wherein the receptacle 6 and/or the container are isothermal.

7. The system as claimed in claim 2, wherein: the receptacle, the hydraulic circuit, and the water processing installation are installed in a parallelepipedal 20-foot, 40-foot or 45-foot container adapted for transportation by ship or aircraft.

8. The system as claimed in claim 1, wherein the installation is adapted to maintain the water circulating in the compartments at a temperature between 1° C. and 5° C.

9. The system as claimed in claim 1, wherein the water processing installation comprises a buffer vessel connected to the hydraulic circuit, a cooling device being immersed in said vessel.

10. The system as claimed in claim 9, wherein the cooling device has the form of an exchanger in which cold air generated by an air-conditioning module circulates.

11. The system as claimed in claim 1, wherein each module has the form of a unit in which tubular compartments are provided, disposed in rows and/or columns and/or in a staggered fashion.

12. The system as claimed in claim 1, wherein the downstream end of each compartment is partially closed off by a divisible closing means adapted to prevent the seafood from exiting said compartment, while at the same time allowing the water flow to pass through.

13. A method for storing live seafood comprising:
   placing the live seafood in separate tubular compartments each having an upstream end and a downstream end,
   generating a circulation of water in each of the compartments,
   processing the water in circulation so as to adapt the composition thereof to the seafood,
wherein said method comprises the steps consisting in:
   providing the tubular compartments in at least one module having the form of a unit, said compartments being made such that the upstream end thereof and the downstream end thereof are open, which unit is produced from a lightweight material so that it can be handled, when empty, by one operator,
   generating a water flow to penetrate the compartments via the upstream end thereof and to re-emerge via the downstream end thereof, the seafood being immersed in this water flow,
   maintaining the water circulating in the compartments at a temperature below 25° C.

14. The method as claimed in claim 13, wherein the water is taken directly from the location where the live seafood is fished or harvested.

15. The method as claimed in claim 13, wherein, after having placed the live seafood in each of the compartments, said method consists in:
   inserting the module into a watertight receptacle,
   introducing water into the receptacle so as to form a bath in which the module is immersed, and continuously circulating the water in said receptacle so as to create a water flow in each of the compartments, between the upstream end thereof and the downstream end thereof.

* * * * *